United States Patent
Darda et al.

(10) Patent No.: US 10,612,377 B2
(45) Date of Patent: Apr. 7, 2020

(54) HYDRAULICALLY OPERATED SPLITTING DEVICE

(71) Applicant: DARDA GmbH, Blumberg (DE)

(72) Inventors: Burkhard Darda, Donaueschingen (DE); Michael Scherzinger, Villingen-Schwenningen (DE)

(73) Assignee: DARDA GmbH, Blumberg (DE)

( * ) Notice: Subject to any disclaimer, the term of this patent is extended or adjusted under 35 U.S.C. 154(b) by 75 days.

(21) Appl. No.: 15/906,119

(22) Filed: Feb. 27, 2018

(65) Prior Publication Data

US 2019/0024507 A1 Jan. 24, 2019

(30) Foreign Application Priority Data

Apr. 18, 2017 (DE) .................. 10 2017 108 238

(51) Int. Cl.
*E21C 37/08* (2006.01)
*E21C 37/04* (2006.01)
(Continued)

(52) U.S. Cl.
CPC ............. *E21C 37/08* (2013.01); *B28D 1/00* (2013.01); *E21C 37/02* (2013.01); *E21C 37/04* (2013.01);
(Continued)

(58) Field of Classification Search
CPC .......... E21C 37/02; E21C 37/06; E21C 37/08; E21C 37/04; F16N 29/00; F16N 29/02; F16N 29/04
See application file for complete search history.

(56) References Cited

U.S. PATENT DOCUMENTS 3,743,357 A 7/1973 Fletcher
5,060,761 A * 10/1991 Arndt .................... B25D 17/26
                                                    184/29
(Continued)

FOREIGN PATENT DOCUMENTS

EP 0 430 024 B1 6/1991
EP 1 626 225 B1 2/2006
(Continued)

OTHER PUBLICATIONS

EPO office action for related European application 18 15 926.1, dated Sep. 7, 2018.

*Primary Examiner* — Janine M Kreck
*Assistant Examiner* — Michael A Goodwin
(74) *Attorney, Agent, or Firm* — William Gray Mitchell

(57) ABSTRACT

The present invention is a hydraulically operated splitting device with a piston cylinder unit comprising an extending chamber and a retracting chamber in which a piston is supported, displaceable in an extending direction and a retracting direction, allowing the extending chamber and the retracting chamber to be impinged with pressurized hydraulic medium for moving the piston at a displacement speed, a cylinder housing at which a plurality of pressure pads is supported, displaceable perpendicular to the extending direction and the retracting direction, a wedged lance connected to a piston rod of the piston and mobile with said piston, which engages wedge-shaped pressure areas of the pressure pads complementary to the wedged lance, and moves the pressure pads perpendicular to the extending direction and the retracting direction, a lubrication unit by which lubricant can be inserted from a lubricant reservoir to an area between the wedged lance and the pressure pads, with the splitting device comprising a protective unit by
(Continued)

which the displacement speed can be reduced depending on the fill level of the lubricant in the lubricant reservoir.

9 Claims, 4 Drawing Sheets

(51) Int. Cl.
*E21C 37/02* (2006.01)
*B28D 1/00* (2006.01)
*F16N 11/10* (2006.01)
*F16N 19/00* (2006.01)
*F16N 29/00* (2006.01)
*E21C 47/10* (2006.01)
*F15B 15/14* (2006.01)
*F01M 11/04* (2006.01)

(52) U.S. Cl.
CPC .............. *E21C 47/10* (2013.01); *F15B 15/14* (2013.01); *F16N 11/10* (2013.01); *F16N 19/00* (2013.01); *F16N 29/00* (2013.01); *F01M 2011/0483* (2013.01); *F15B 2211/40515* (2013.01); *F15B 2211/413* (2013.01); *F15B 2211/41527* (2013.01); *F15B 2211/42* (2013.01); *F15B 2211/455* (2013.01); *F15B 2211/61* (2013.01); *F15B 2211/86* (2013.01); *F16N 2210/00* (2013.01); *F16N 2260/04* (2013.01)

(56) References Cited

U.S. PATENT DOCUMENTS

| | | | |
|---|---|---|---|
| 7,313,956 B1 * | 1/2008 | Murphy, Sr. | G01F 23/70 73/305 |
| 2011/0226228 A1 * | 9/2011 | Vanhatalo | B28D 1/222 125/23.01 |
| 2012/0043163 A1 * | 2/2012 | Jagdale | B25D 17/26 184/6.4 |
| 2015/0047928 A1 * | 2/2015 | Hiner | F15B 13/0403 184/6.14 |
| 2017/0260858 A1 * | 9/2017 | Beaton | E21C 1/00 |

FOREIGN PATENT DOCUMENTS

| | | |
|---|---|---|
| SU | 1093809 A1 | 5/1984 |
| SU | 1265325 A1 | 10/1986 |
| SU | 1266984 A1 | 10/1986 |

* cited by examiner

HYDRAULICALLY OPERATED SPLITTING DEVICE

CROSS REFERENCE TO RELATED APPLICATIONS

This patent application claims priority to German Patent Application 102017108238.7, filed Apr. 18, 2017.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to hydraulically operated splitting devices.

Background of the Invention

Hydraulically operated splitting devices are known from the prior art which include a piston-cylinder unit comprising an extending chamber and a retracting chamber, in which a piston is supported in a manner displaceable in the extending direction and the retracting direction, and the extending chamber and the retracting chamber can be impinged with a pressurized hydraulic medium for displacing the piston at a displacement speed. Usually, two elongated pressure pads are supported in a cylinder housing, which are displaceable perpendicular to the extending direction and the retracting direction. A wedged lance, connected to a piston rod of the piston and mobile with said piston, engages two pressure surfaces of the pressure pads, wedged in form and complementary matching the wedged lance, and moves the pressure pads depending on the position of the piston in the piston-cylinder unit perpendicular to the direction of displacement of the piston.

Such hydraulically operated splitting devices are used for example to split concrete, rock, and similar brittle-hard materials in rock quarries, but also for demolition work. A wide field of application is the mining of rock in quarries, where such splitting devices are used to split large-size boulders are off of a massive cliff. When using devices known from the prior art, the processing occurs such that bore holes are inserted into the bolder with a diameter which is selected such that the elongated pressure pads with the retracted wedged lance can be inserted into the bore holes. When the pressure pads of the splitting device have been inserted in these bore holes and the wedged lance is then extended by way of hydraulic impingement of the piston-cylinder unit, the pressure pads are forced apart and in this way split the cliff by the pressure applied upon the wall of the bore hole. In order to change the stroke-force ratio when forcing apart the pressure pads, wedged lances and pressure pads with different inclines are known. It is also known for the use of splitting devices in already widened bore holes to apply so-called expansion blocks, i.e. pressure pads with a diameter enlarged in one direction.

The splitting devices of the prior art working hydraulically are commonly operated with a conveyer unit embodied as a hydraulic pump, which applies a pressure upon the hydraulic medium. This pressure is applied upon the piston-cylinder unit both in the extending direction as well as in the retracting direction.

Strong friction results between the wedged lance and the pressure pads, which leads to high wear and tear of the pressure pads and the wedged lance so that they must be exchanged after relatively few operating hours. The number of operating hours after which the pressure pads or lances must be exchanged can be considerably increased by applying a lubricant between the wedged lance and the pressure pads. It is therefore known to equip the splitting devices with a lubrication unit, by which the lubricant can be inserted from a lubricant reservoir to the area between the wedged lance and the pressure pads. In some splitting devices, the operator must manually activate the lubrication unit such that there is the risk that in case such activation was omitted, the wear and tear is reduced only to a certain extent and the operating hours cannot be increased to the maximally possible scope.

In other splitting devices, the lubricant is automatically inserted between the wedged lance and the pressure pads during operation such that the lubrication requires no initiation by the operator.

In both cases, it cannot be determined if sufficient lubricant is still present in the lubricant reservoir. The splitting devices continue to be operated, without the operator learning that no lubricant is left, such that the wear and tear cannot be reduced and the operating hours cannot be increased to the maximally possible extent.

The objective of the present invention is therefore to provide a splitting device by which this disadvantage is corrected. In particular, a splitting device shall be provided by which the wear and tear can be securely reduced and the number of operating hours can be increased, after which the wedged lance and the pressure pads must be exchanged.

This objective is attained by the features as described herein.

BRIEF SUMMARY OF THE INVENTION

In a preferred embodiment, a hydraulically operated splitting device (10) comprising:
  a piston-cylinder unit (12) with an extending chamber (22) and a retracting chamber (24), in which a piston (14) is supported displaceable in an extending direction and a retracting direction, allowing the projecting chamber (22) and the retracting chamber (24) to be impinged with pressurized hydraulic medium for moving the piston (14) with a displacement speed,
  a cylinder housing (18) at which a plurality of pressure pads (26) is supported in a displaceable manner and perpendicular to the extending direction and the retracting direction,
  a wedged lance (20) connected to a piston rod (16) of the piston (14) and movable with said piston (14), which engages wedge-shaped pressure areas of the pressure pads (26), which are complementary to the wedged lance (20), and displaces the pressure pads (26) depending on the position of the piston (14) in the piston (14)

cylinder unit (12) perpendicular to the extending direction and the retracting direction,
a lubricating unit (44) by which lubricant can be inserted from a lubricant reservoir (46) between the wedged lance (20) and the pressure pads (26), with
the splitting device (10) comprising a protective unit (74) by which the displacement speed can be reduced depending on the fill level of the lubricant in the lubricant reservoir (46).

In another preferred embodiment, the hydraulically operated splitting device (10) as described herein, characterized in that the protective unit (74) is embodied such that only the displacement speed during the extension of the piston (14) can be reduced.

In another preferred embodiment, the hydraulically operated splitting device (10) as described herein, characterized in that the splitting device (10) comprises a pipeline (25) in which the hydraulic medium can be conveyed into the extending chamber (22) and the retracting chamber (24) and the protective unit (74) comprises a throttle (76) arranged in the pipeline (25), by which the flow rate of the hydraulic medium can be reduced depending on the fill level of the lubricant in the lubricant reservoir (46).

In another preferred embodiment, the hydraulically operated splitting device (10) as described herein, characterized in that the throttle (76) comprises a slide (80) that can be inserted into the pipeline (25), which can be actuated with a conveyer piston (58) that is mobile in the lubricant reservoir (46) and can be operated by pressure or spring force.

In another preferred embodiment, the hydraulically operated splitting device (10) as described herein, characterized in that the conveyer piston (58) divides the lubricant reservoir (46) into a lubricant chamber (60) and a pressure chamber (62), with the pressure chamber (62) being connected to the pipeline (25).

In another preferred embodiment, the hydraulically operated splitting device (10) as described herein, characterized in that the slide (80) is spring-loaded.

In another preferred embodiment, the hydraulically operated splitting device (10) as described herein, characterized in that the lubrication device (44) comprises a dosing unit (64) connected to the lubricant reservoir (46) for dosing the volume of the lubricant conveyed between the wedged lance (20) and the pressure pads, with the dosing unit (64) being embodied such that it conveys lubricant between the wedged lance (20) and the pressure pads only during the extension or only during the retraction of the piston (14).

In another preferred embodiment, the hydraulically operated splitting device (10) as described herein, characterized in that the lubricating unit (44) comprises a fill valve (82), which can be adjusted to a fill setting to fill the lubricant reservoir in which lubricant can be introduced into the lubricant reservoir (46).

In another preferred embodiment, the hydraulically operated splitting device (10) as described herein, characterized in that the pipeline (25) can be connected to a conveyer device (36) for conveying the hydraulic medium in the pipeline (25) and the fill valve (82) in the fill position separates at least a portion of the pipeline (25) from the conveyer device (36).

In another preferred embodiment, the hydraulically operated splitting device (10) as described herein, characterized in that the fill valve (82) in the fill setting closes the outlet of the lubricant reservoir (46).

Figure 1:
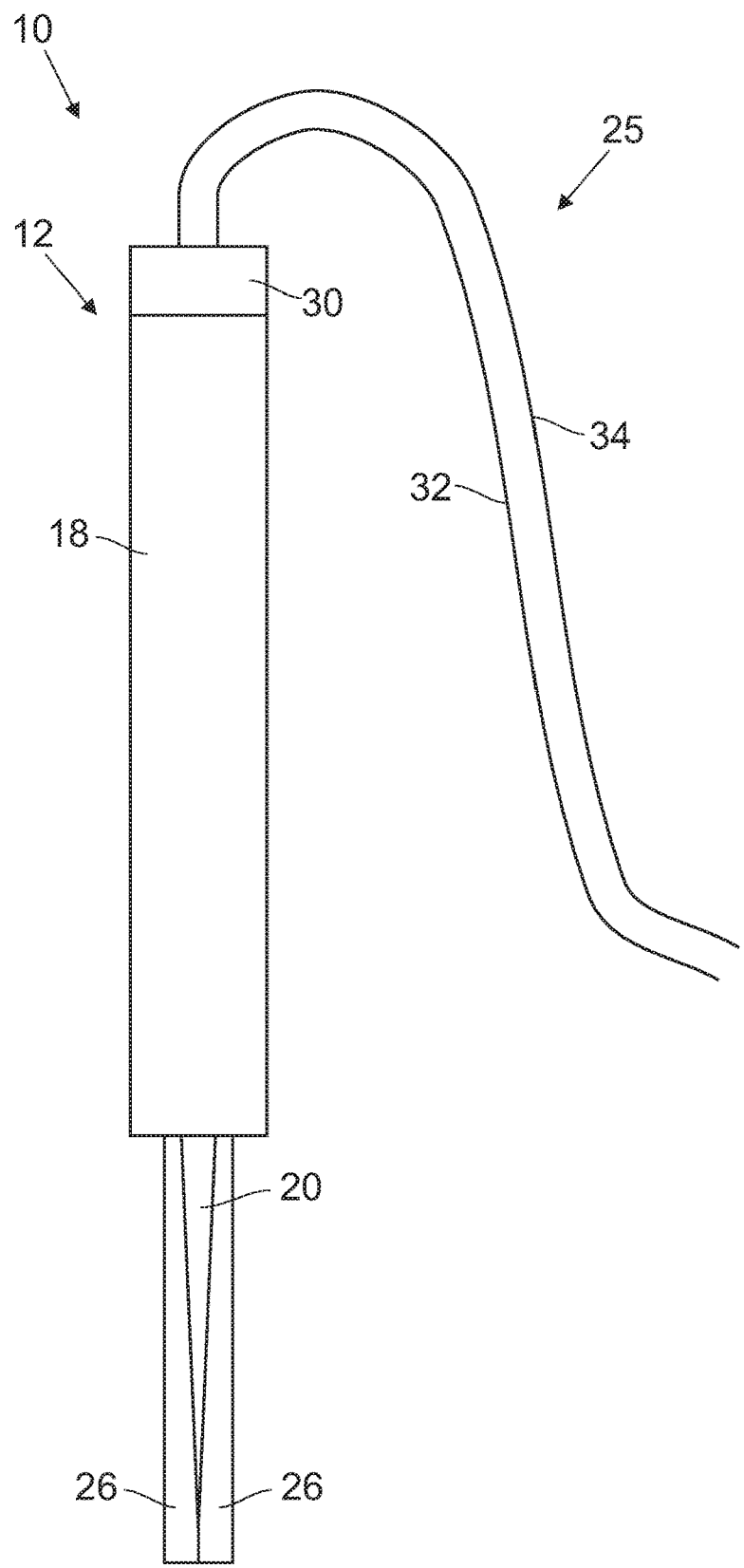
FIG. 1 is a line drawing evidencing a schematic illustration of a splitting device according to the invention.

Each of FIGS. 3A to 3D is an exemplary embodiment of a protective device according to the invention in various operating conditions.

DETAILED DESCRIPTION OF THE INVENTION

One embodiment of the invention relates to a hydraulically operated splitting device comprising a piston-cylinder unit with an extending chamber and a retracting chamber, in which a piston is supported such that it is displaceable in the extending direction and in the retracting direction, and in order to displace the piston with a displacement speed a pressurized hydraulic medium can impinge the extending chamber and the retracting chamber, with a cylinder housing at which a plurality of pressure pads are supported in a manner displaceable perpendicular to the extending direction and the retracting direction, and with a wedged lance connected to a piston rod of the piston and movable together with said piston, which engages wedge-shaped pressure areas of the pressure pads complementary to the wedged lance, and moves the pressure pads depending on the position of the piston in the piston-cylinder unit perpendicular in reference to the extending direction and the retracting direction. Further, the splitting device comprises a lubricating unit, by which a lubricant can be inserted from a lubricant reservoir to an area between the wedged lance and the pressure pads, and an extending unit by which the displacement speed can be reduced depending on the fill level of the lubricant in the lubricant reservoir.

The protecting unit can be embodied here such that the displacement speed is reduced depending on the fill level or reduced completely or almost completely to zero. When moving the wedged lance along the pressure areas, friction develops, which increases with rising speeds. Consequently, a reduction of the displacement speed leads to a reduction of the wear and tear and to an increase of operating hours, after which the wedged lance and the pressure pads must be exchanged. The protecting unit can be embodied here such that the reduction of the displacement speed occurs only when the fill level has fallen below a certain value, for example when the volume of the lubricant in the lubricant reservoir amounts to less than 15 to 20% of the maximum volume. Further, the protecting device can be embodied such that the displacement speed is reduced to zero when no lubricant is left in the lubricant reservoir. The reduction of the displacement speed to zero must be considered a theoretic case, because at high pressures, which may amount to values up to 500 bar, a certain leakage is always given such that the piston and consequently the wedged lance are still moved, however at a very slow speed.

The reduction of the displacement speed is an easily detected signal for the operator that the lubricant is running out and new lubricant must be filled. The continued operation of the splitting devices is still possible, albeit with reduced effectiveness. However, sufficient time remains to prepare for refilling lubricant such that any downtime of the splitting device can be kept low.

The reduction of the displacement speed to zero prevents any further operation of the splitting device such that any dry operation and the associated increase of wear and tear can also be prevented. The lifespan of the splitting device is considerably increased with the protecting unit suggested here.

According to another embodiment, the protective unit can be embodied such that only the displacement speed during the extension of the piston can be reduced. As mentioned at the outset, for example cliffs are split into large boulders such that the pressure pads are pressed radially outward by projecting the wedged lance, with the wedged lance being moved by the piston. The forces acting during the extension process between the wedged lance and the pressure pads and thus the friction are considerably higher than during the retraction, such that any further operation without lubricant leads to considerably less increase in wear and tear during the retraction than during the extension. In this regard, further operation without lubrication during the retraction can be accepted within certain limits. It is ensured that in any case the splitting device can be removed from the bore holes.

In a further developed embodiment, the splitting device may include a pipeline in which the hydraulic medium can be conveyed into the extending chamber and the retracting chamber and the protective unit may comprise a throttle arranged in the pipeline by which the volume flow of the hydraulic medium can be reduced depending on the fill level of the lubricant in the lubricant reservoir. The volume flow by which the extending chamber and the retracting chamber is filled with the hydraulic medium determines the displacement speed of the piston and consequently that of the wedged lance. The use of the throttle allows in a simple fashion the reduction of the volume flow of the hydraulic medium in the pipeline and thus the displacement speed. In order to reduce the volume flow of the hydraulic medium downstream in reference to the throttle, the throttle reduces the cross-section of the flow.

In a further developed embodiment, the throttle may comprise a slide that can be inserted into the pipeline, which can be actuated by a pressurized or spring-loaded conveyer piston which is mobile in the lubricant reservoir. The conveyer piston ensures the transportation of the lubricant to the wedged lance and to the pressure pads by the conveyer piston pressing the lubricant out of the lubricant reservoir. Due to the fact that the conveyer piston is pressurized or spring-loaded, the transportation can occur independently or largely independently from the fill level of the lubricant in the lubricant reservoir. The conveyer piston follows the free surface of the lubricant such that its position indicates the fill level and consequently the remaining volume of the lubricant in the lubricant reservoir. The slide may project into the lubricant reservoir and then, starting at a certain fill level, comes into contact with the conveyer piston. The conveyer piston then displaces the slide into the pipeline, generating a reduced cross-section and consequently a reduction of the volume flow of the hydraulic medium downstream in reference to the slide in the pipeline. This embodiment can be implemented in a particularly simple and compact fashion.

According to a further developed embodiment, the conveyer piston divides the lubricant reservoir into a lubricant chamber and a pressure chamber, with the pressure chamber being connected to the pipeline. In this case, the pressure of the hydraulic medium generates the thrust of the conveyer piston such that no additional measures need to be taken for stressing the conveyer piston.

In another embodiment, the slide may be spring-loaded. With the spring characteristic of the spring by which the slide is spring-loaded, the manner can be easily influenced in which the volume flow of the hydraulic medium and consequently the displacement speed can be reduced. Additionally, the slide is again reset to its initial position when the lubricant reservoir is refilled.

Another further developed embodiment is characterized in that the lubrication unit comprises a dosing device connected to the lubricant reservoir for dosing the volume of the lubricant conveyed between the wedged lance and the pressure pads, with the dosing unit being embodied such that it conveys lubricant between the wedged lance and the pressure pads only during the extension or only during the retraction of the piston. With the dosing device, the volume of the lubricant can be determined, which should be conveyed between the wedged lance and the pressure pads. Depending on the application and the pressure pads used, the optimal volume here can be selected such that neither overdosing nor under-dosing occurs. Due to the fact that only during the extending or retracting of the piston is the lubricant conveyed between the wedged lance and the pressure pads, an effective use of the lubricant is enabled.

According to another embodiment, the lubrication device comprises a fill valve, which can be adjusted to a fill position for filling the lubricant reservoir, in which lubricant can be inserted into the lubricant reservoir. The splitting device typically comprises a fill socket by which the lubricant can be refilled. In an operating position, the fill valve closes the fill socket or a pipeline section leading to the fill socket such that the lubricant cannot exit via the fill socket. When lubricant needs to be refilled, the fill valve is set to the filling position, which releases the access to the lubricant reservoir.

Another embodiment is characterized in that the pipeline can be connected to a conveyer device for transporting the hydraulic medium in the pipeline, and the fill valve severs in the fill position at least a portion of the pipeline from the conveyer device. It is not mandatory for the splitting device to show a separate conveyer unit by which the hydraulic medium can be pressurized. The splitting device can be connected for example to a backhoe, which comprises such a conveyer device, particularly a hydraulic pump. The separating of the pipeline from the conveyer device allows the refilling of lubricant without it being required that the conveyer device is connected to the splitting device. This way, the handling can be simplified, because the lubricant can be refilled at a location distanced from the backhoe. The hydraulic lines do not interfere with the filling process.

In another further developed embodiment, the fill valve closes the outlet of the lubricant reservoir in the fill position. This ensures that the lubricant can be filled into the lubricant reservoir, however the lubricant cannot exit the lubricant reservoir in an uncontrolled fashion. In particular, when the lubricant shows very low viscosity, the flowing of the lubricant during the refill process between the wedged lance and the pressure pads is prevented.

DETAILED DESCRIPTION OF THE FIGURES

Figure 2:
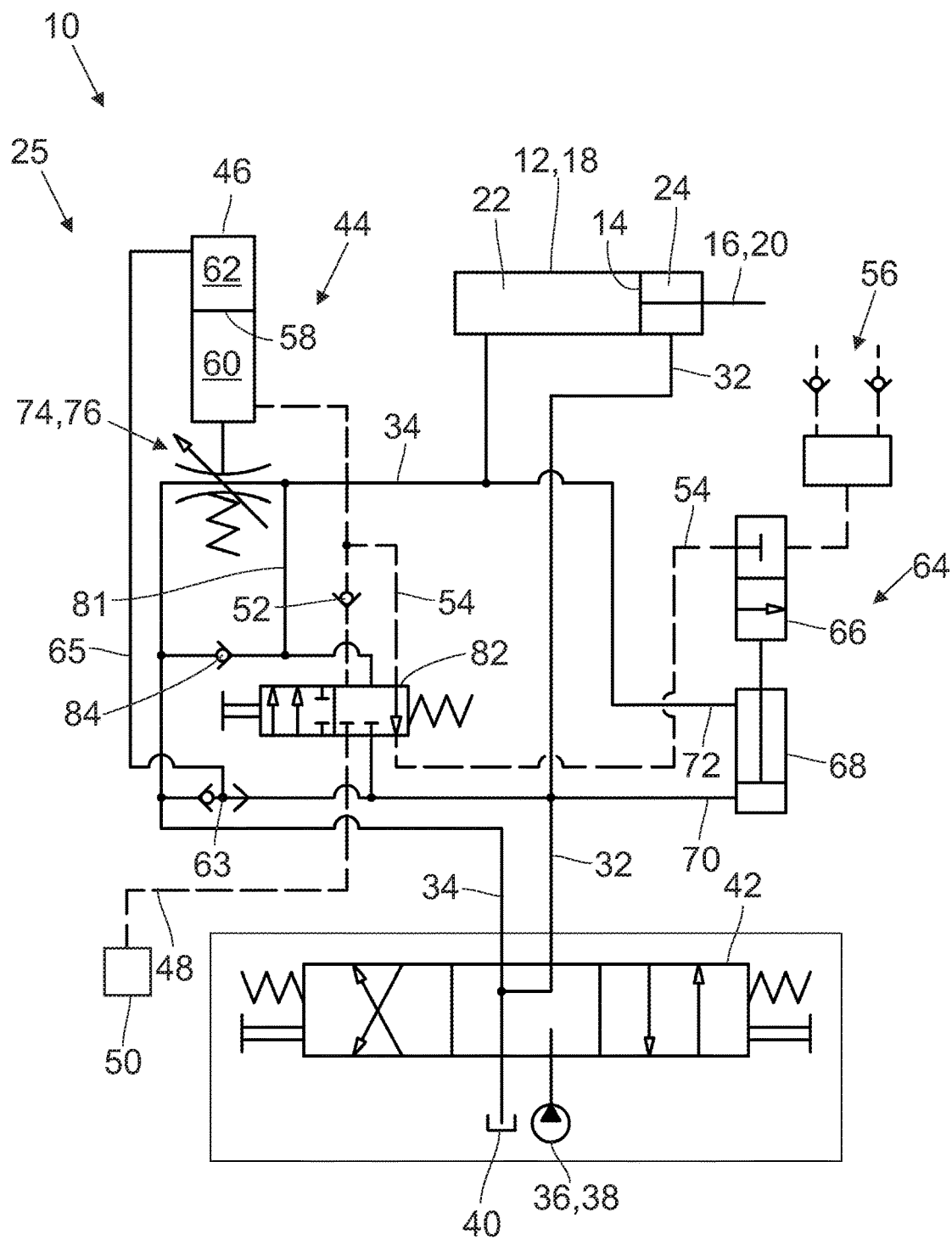
FIG. 2 is a line drawing evidencing a hydraulic diagram of the splitting device according to the invention.
Figure 3A:
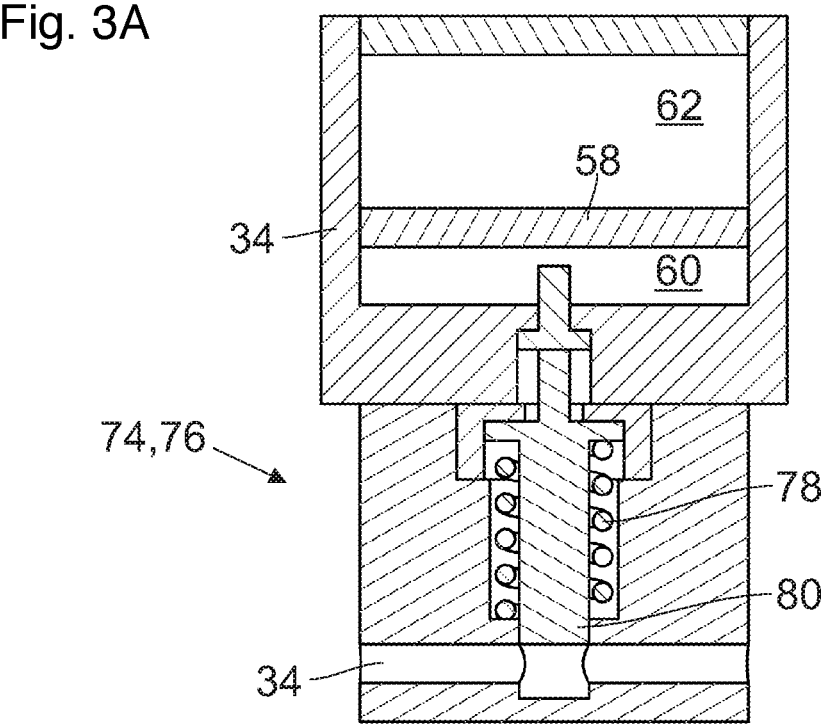
Figure 3B:
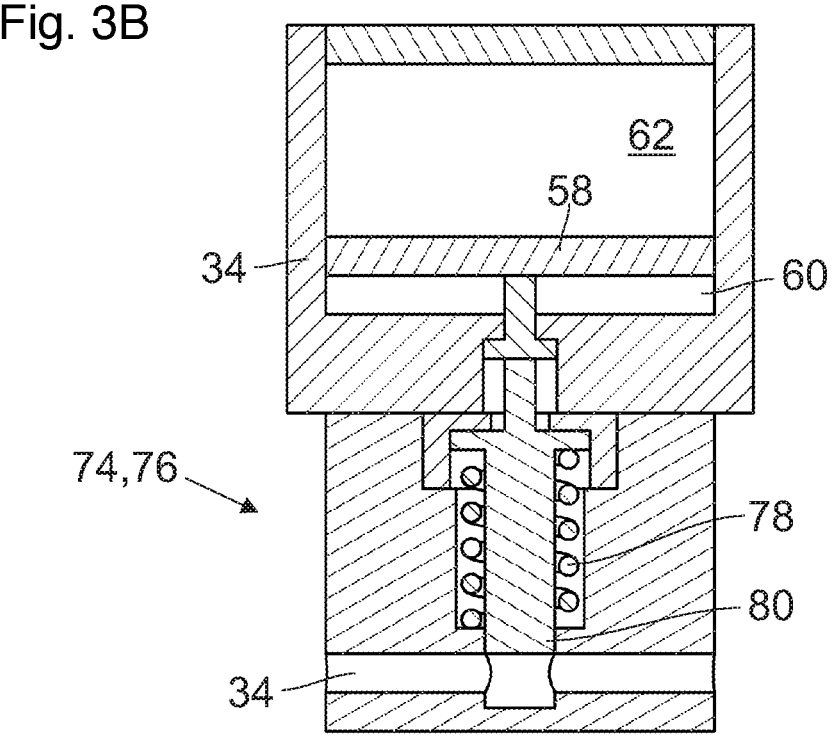
Figure 3C:
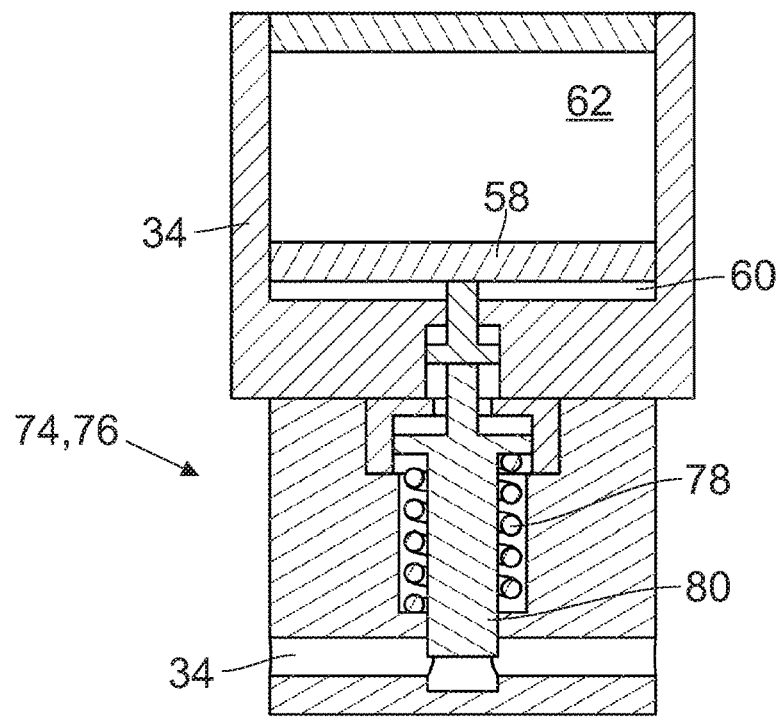
Figure 3D:
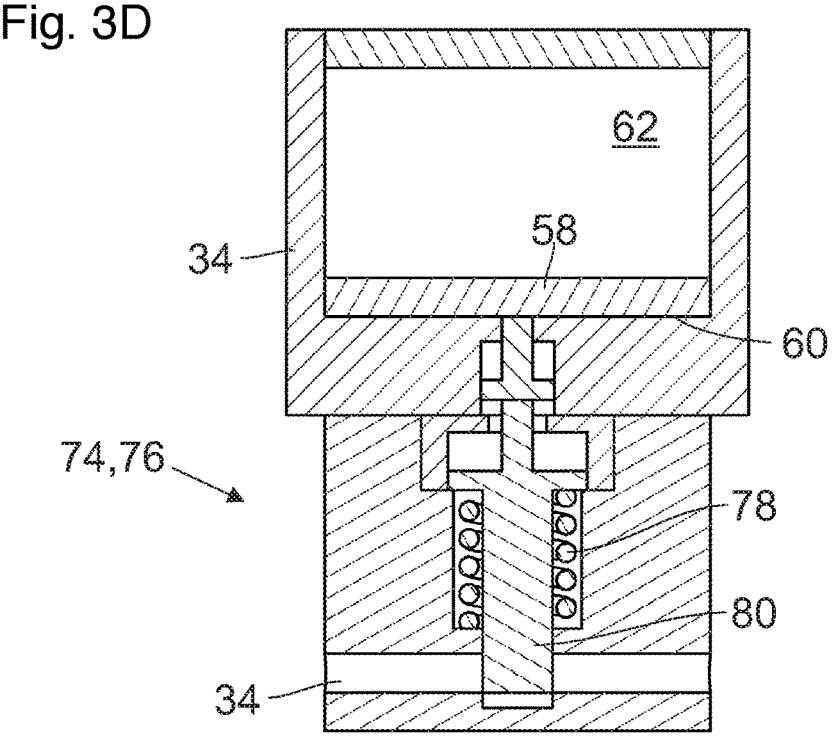

FIG. 1 shows a schematic illustration of a hydraulically operated splitting device 10 of a piston-cylinder unit 12 with an elongated cylinder housing 18, in which a piston 14 with a piston rod 16 is supported in a displaceable fashion in an extending direction and a retracting direction (see FIG. 2). A wedged lance 20 is fastened at the piston rod 16. The piston 14 divides the interior of the cylinder housing 18 into an extending chamber 22 as well as a retracting chamber 24, which can be impinged via a pipeline 25 with hydraulic medium. When the projecting chamber 22 is impinged, the piston 14 is moved with a displacement speed in an extending direction and, when the retracting chamber 24 is impinged with a displacement speed, it is moved in the opposite retracting direction. The wedged lance 20 follows the movement of the piston 14.

The wedged lance 20 is arranged between two elongated pressure pads 26, which are fixed in the extending and retracting direction, which are however displaceable and perpendicular and which are connected to the cylinder housing 18. When the wedged lance 20 is extended or retracted, the pressure pads 26 are separated according to the direction of motion of the wedged lance 20 and/or the corresponding direction of motion of the piston 14 (extending) and/or can return in the direction of the longitudinal axis of the wedged lance 20 (retracting).

The splitting device 10 comprises a housing 30, which is fastened at the cylinder housing 18 and in which at least some of the components of the pipeline 25 are arranged shown in FIG. 2.

The pipeline 25 comprises a pressure line 32 and a tank line 34. A hydraulic medium is stored in a tank 40. In this case the conveyer unit 36 is embodied as a hydraulic pump 38, by which the hydraulic medium can be pressurized.

The pressure line 32 and the tank line 34 are connected via a 4/3 control valve 42. In a first switch position of the control valve, the conveyer device 36 is connected to the pressure line 32 and the tank 40 to the tank line 34, where in a second switch position of the 4/3 control valve 42, the conveyer device 36 is connected to the tank line 34 and the tank 40 to the pressure line 32. Consequently, the hydraulic medium conveyed by pressure of the conveyer device 36 can be applied both to the pressure line 32 as well as to the tank line 34. The names selected serve only for distinguishing the individual lines.

In the first switch position of the 4/3 control valve 42, the retracting chamber 24 is impinged with hydraulic medium, causing the piston 14 and consequently the wedged lance 20 to be moved in the retracting direction. In the second switch position, the extending chamber 22 is impinged with hydraulic medium such that the piston 14 and consequently the wedged lance 20 are moved in the extending direction.

In a resting position, which is shown arranged between the first and the second switch position of the 4/3 control valve 42 and is accepted in a spring-loaded fashion, both the pressure line 32 as well as the tank line 34 are connected to the tank 40 such that both the pressure line 32 as well as the tank line 34 are switched without pressure into this resting position.

It must be noted that the tank 40, the conveyer device 36, and the 4/3 control valve 42 are not mandatorily arranged at the splitting device 10 but may be located in an external unit, for example in a backhoe, not shown, such that the splitting device 10 is designed in a machine-controlled fashion. However, the integrated arrangement at the splitting device 10 is possible, such that the splitting device 10 can also be designed in a manually controlled fashion.

Further, the splitting device 10 comprises a lubricating unit 44, by which lubricant can be inserted from a lubricant reservoir 46 to an area between the wedged lance 20 and the pressure pads 26. The lubricating unit 44 comprises a fill line 48 which is connected to a fill socket 50. The lubricant can be filled into the lubricant reservoir 46 via the fill socket 50 and the fill line 48. A return valve 52 is provided in the fill line 48. Seen in the fill direction, downstream in reference to the return valve 52, a drain line 54 branches off the fill line 48, which leads to a distributor 56, by which the lubricant can be discharged between the wedged lance 20 and the two pressure pads 26.

A conveyer piston 58 is arranged in a displaceable fashion in the lubricant reservoir 46. The conveyer piston 58 divides the lubricant reservoir 46 into a lubricant chamber 60, in which the lubricant is accepted, and a pressure chamber 62.

The pipeline comprises a control valve 63, which is connected to both the pressure line 32 as well as the tank line 34. A connecting line 65 leads from the control valve 63 to the pressure chamber 62. If the 4/3 control valve 42 is adjusted to the first or the second switch position, the pressure chamber 62 is impinged with the hydraulic medium and displaces the conveyer piston 58 accordingly in the lubricant reservoir 46, resulting in the lubricant being pressed out of the lubricant chamber 60 and conveyed to the distributor 56.

The lubricant reservoir 46 can also be embodied as an exchangeable lubricant cartridge. The above-described functions remain unchanged thereby.

A dosing unit 64, shown in a simplified fashion, is arranged between the lubricant reservoir 46 and the distributor 56, by which the volume of the lubricant discharged by the distributor 56 can be adjusted. The dosing unit 64 comprises a 2/2 control valve 66, which releases in a first switch position the connection between the lubricant reservoir 46 and the distributor 56, and in a second switch position severs this connection, as shown. The 2/2 control valve 66 is connected to a control piston 68, which is connected via a first supply line 70 and a second supply line 72 to the pipeline 25 and can be impinged with the hydraulic medium and brought into the first or the second switch position. In the exemplary embodiment shown, the 2/2 control valve 66 is integrated in the pipeline 25 such that the connection between the lubricant reservoir 46 and the distributor 56 is only released when the piston 14 and consequently the wedged lance 20 are moved in the retracting direction. Only then is the lubricant released via the distributor 56.

Further, the control device 10 comprises a protective unit 74, which is embodied as a throttle 76 and in this case can reduce the cross-section of the flow of the tank line 34. As particularly discernible from FIGS. 3A to 3D, in which the connection lines 65 ending in the pressure chamber 62 and the fill line 48 ending in the lubricant chamber 60 are not shown, the throttle 76 comprises a slide 80, pre-stressed with a spring 78 into an open position, which can be inserted into the tank line 34. The slide 80 projects by a certain extent into the lubricant chamber 60. Upon decreasing fill level of the lubricant in the lubricant chamber 60, the conveyer piston 58 is moved towards the slide 80. Starting at a certain fill level, the conveyer piston 58 comes into contact with the slide 80 (see FIG. 3B). When the fill level drops further, the slide 80 projects into the tank line 34 and reduces the flow cross-section available for the hydraulic medium, causing the flow rate of the hydraulic medium to be reduced downstream in reference to the slide 80 (see FIG. 3C). The reduction of the flow rate of the hydraulic medium leads to the displacement speed of the piston and consequently the wedged lance 20 being reduced in the extending direction. Once the lubricant is completely removed from the lubricant chamber 60, the slide 80 completely blocks the tank line 34 (see FIG. 3D) such that the extending chamber 22 cannot be impinged any longer with the hydraulic medium. Consequently, the wedged lance 20 cannot be moved any longer in the extending direction and the displacement speed is reduced to zero. Any extending of the wedged lance 20 without sufficient lubrication is therefore prevented.

The protective device 74 is integrated in the pipeline 25 such that only a displacement speed during extension is reduced or completely or almost completely reduced to zero, however not the displacement speed during retraction of the piston and/or the wedged lance 20. Any retraction is therefore possible even when no lubricant is available in the lubricant chamber 60. The pipeline 25 comprises a bypass line 81, by which the throttle 76 can be circumvented. Another return valve 84 is provided in the bypass line 81, which ensures that, during the extension of the wedged lance 20, the hydraulic medium must flow through the throttle 76. When the wedged lance 20 retracts, the hydraulic medium flows through the bypass line 81 and not through the throttle 76 when the cross-section of the flow in the throttle 76 is reduced.

The splitting device 10 further comprises a 6/2 fill valve 82, which can be switched between an operating position and a fill position. In the exemplary embodiment shown, the 6/2 fill valve 82 is set into the operating position by a spring-loaded operation. 6/2 fill valve 82 is connected to the fill line 48 and the drain line 54. Furthermore, the pressure line 32 and the tank line 34 are connected to the 6/2 fill valve 82. In the operating position shown, the 6/2 fill valve 82 releases the drain line 54, while it blocks the fill line 48 and disconnects the pressure line 32 from the tank line 34. Consequently, on the one hand, no lubricant can be filled via the fill line 48 into the lubricant chamber 60, and on the other hand, no lubricant can drain via the fill socket 50. In the fill position, in which the 6/2 fill valve 82 can for example be adjusted by screwing in a fill adapter, here the 6/2 fill valve 82 blocks the drain line 54, while it releases the fill line 48 such that lubricant can be inserted into the lubricant chamber 60. Furthermore, the 6/2 fill valve 82 connects in the fill position the pressure line 32 and the tank line 34, causing them to be switched unpressurized. This way, it is achieved that the pressure chamber 62 is not pressurized, such that the lubricant can be filled, for example with a grease gun, into the lubricant chamber 60 without requiring a strong force.

As mentioned above, the lubricant reservoir 46 can also be embodied as an exchangeable lubricant cartridge. In this case, no filling of the lubricant reservoir 46 is required in the above-described fashion. The provision of the 6/2 fill valve 82 is not required in this case.

The dosing device 64 can be adjusted such that for each retracting process a volume from 0 to 8 cm$^3$ can be discharged. A volume from 0.7 to 0.8 cm$^3$ per retraction process has been proven sufficient for most applications. The lubricant chamber 60 can be embodied such that it can provide a volume of 0.71 for the lubricant. The protective device 74 can be embodied such that the displacement speed is reduced when only 15 to 20% of the maximum volume of lubricant is present in the lubricant chamber 60. The slide 80 and the spring 78 by which the slide 80 is pre-stressed can be embodied such that from the start of reducing the cross-section to the complete blockage of the tank line 34 the wedged lance 20 can be retracted and extended another 15 to 20 times when the dosing device 64 is adjusted such that it discharges the maximum volume of lubricant.

An embodiment is not shown in which the pressure line 32 and the tank line 34 are connected to a pressure transmitter, also called booster, which amplifies the pressure of the hydraulic medium. The booster is addressed such that it is no longer activated when the cross-section of the tank line 34 is reduced. However, when the piston and/or the wedged lance 20 retract the booster is activated.

LIST OF REFERENCE NUMBERS

10 Splitting device
12 Piston-cylinder unit
14 Piston
16 Piston rod
18 Cylinder housing
20 Wedged lance
22 Extending chamber
24 Retracting chamber
25 Pipeline
26 Pressure pad
30 Housing
32 Pressure line
34 Tank line
36 Conveyer device
38 Hydraulic pump
40 Tank
42 4/3 control valve
44 Lubricating unit
46 Lubricant reservoir
48 Fill line
50 Fill socket
52 Return valve
54 Drain line
56 Distributor
58 Conveyer piston
60 Lubricant chamber
62 Pressure chamber
63 Control valve
64 Dosing unit
65 Connection line
66 2/2 control valve
68 Switch piston
70 first supply line
72 second supply line
74 Protective device
76 Throttle
78 Spring
80 Slide
81 Bypass-line
82 6/2 fill valve
84 additional return valve The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A hydraulically operated splitting device comprising:
a piston-cylinder unit with an extending chamber and a retracting chamber, in which a piston is supported displaceable in an extending direction and a retracting direction, allowing the projecting chamber and the retracting chamber to be impinged with pressurized hydraulic medium for moving the piston with a displacement speed,
a cylinder housing at which a plurality of pressure pads is supported in a displaceable manner and perpendicular to the extending direction and the retracting direction,
a wedged lance connected to a piston rod of the piston and movable with said piston, which engages wedge-shaped pressure areas of the pressure pads, which are complementary to the wedged lance, and displaces the pressure pads depending on the position of the piston in the piston cylinder unit perpendicular to the extending direction and the retracting direction, a lubricating unit by which lubricant can be inserted from a lubricant reservoir between the wedged lance and the pressure pads, with the splitting device comprising a protective unit by which the displacement speed can be reduced depending on a fill level of the lubricant in the lubricant reservoir, and wherein the protective unit is embodied such that only the displacement speed during an extension of the piston can be reduced.

2. The hydraulically operated splitting device according to claim 1, wherein the splitting device comprises a pipeline in which the hydraulic medium can be conveyed into the extending chamber and the retracting chamber and the protective unit comprises a throttle arranged in the pipeline, by which the flow rate of the hydraulic medium can be reduced depending on the fill level of the lubricant in the lubricant reservoir.

3. The hydraulically operated splitting device according to claim 2, wherein the throttle comprises a slide that can be inserted into the pipeline, which can be actuated with a conveyer piston that is mobile in the lubricant reservoir and can be operated by pressure or spring force.

4. The hydraulically operated splitting device according to claim 3, wherein the conveyer piston divides the lubricant reservoir into a lubricant chamber and a pressure chamber, with the pressure chamber being connected to the pipeline.

5. The hydraulically operated splitting device according to claim 3, wherein the slide is spring-loaded.

6. The hydraulically operated splitting device according to claim 1, wherein a lubrication device comprises a dosing unit connected to the lubricant reservoir for dosing a volume of the lubricant conveyed between the wedged lance and the pressure pads, with the dosing unit being embodied such that it conveys lubricant between the wedged lance and the pressure pads only during an extension or only during a retraction of the piston.

7. The hydraulically operated splitting device according to claim 6, wherein a fill valve in a fill setting closes an outlet of the lubricant reservoir.

8. The hydraulically operated splitting device according to claim 1, wherein the lubricating unit comprises a fill valve, which can be adjusted to a fill setting to fill the lubricant reservoir in which lubricant can be introduced into the lubricant reservoir.

9. The hydraulically operated splitting device according to claim 8, wherein a pipeline can be connected to a conveyer device for conveying the hydraulic medium in the pipeline and the fill valve in a fill position separates at least a portion of the pipeline from the conveyer device.

* * * * *